(12) United States Patent
Corazza et al.

(10) Patent No.: US 11,242,167 B2
(45) Date of Patent: Feb. 8, 2022

(54) WELDING HEAD

(71) Applicant: TETRA LAVAL HOLDINGS & FINANCE S.A., Pully (CH)

(72) Inventors: Federico Corazza, Bologna (IT); Marco Germinario, Modena (IT); Maurizio Montorsi, Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 16/644,985

(22) PCT Filed: Sep. 10, 2018

(86) PCT No.: PCT/EP2018/074326
§ 371 (c)(1),
(2) Date: Mar. 6, 2020

(87) PCT Pub. No.: WO2019/052950
PCT Pub. Date: Mar. 21, 2019

(65) Prior Publication Data
US 2020/0216210 A1 Jul. 9, 2020

(30) Foreign Application Priority Data

Sep. 18, 2017 (EP) ..................................... 17191612

(51) Int. Cl.
*B65B 51/22* (2006.01)
*B29C 65/36* (2006.01)
(Continued)

(52) U.S. Cl.
CPC .......... *B65B 51/227* (2013.01); *B29C 65/368* (2013.01); *B29C 65/3644* (2013.01);
(Continued)

(58) Field of Classification Search
CPC ... B67B 3/2066; B65B 7/2878; B65B 51/227; B29C 66/8432; B29C 66/8161;
(Continued)

(56) References Cited

U.S. PATENT DOCUMENTS

| 5,492,313 A | 2/1996 | Pan et al. |
| 2016/0102724 A1 | 4/2016 | Potter et al. |
| 2017/0197741 A1* | 7/2017 | Carvin .................... B29C 66/71 |

FOREIGN PATENT DOCUMENTS

| EP | 3153304 A1 | 4/2017 |
| WO | 2011001132 A2 | 1/2011 |
| WO | 2011001132 A3 | 8/2011 |

OTHER PUBLICATIONS

International Search Report (PCT/ISA/210) dated Jul. 11, 2018, by the European Patent Office as the International Searching Authority for International Application No. PCT/EP2018/074326, 4 pages.

(Continued)

*Primary Examiner* — Daniel McNally
(74) *Attorney, Agent, or Firm* — Buchanan Ingersoll & Rooney PC (57) ABSTRACT

A welding head comprises a welding element for welding a lid to an opening device of a container, a supporting body for supporting the welding element and a compensating device for compensating a possible mutual mispositioning of the welding element and the lid during welding of the lid to the opening device, the compensating device being interposed between the supporting body and the welding element, the compensating device comprising a planar spring arrangement provided with at least one planar spring element having a first member and a second member mutually connected by deformable elements.

13 Claims, 4 Drawing Sheets

(51) Int. Cl.
  *B29C 65/56*   (2006.01)
  *B29C 65/00*   (2006.01)
  *B65B 7/28*    (2006.01)
  *B67B 3/20*    (2006.01)
  *F16F 1/02*    (2006.01)
  *B29C 65/78*   (2006.01)
  *B65D 5/74*    (2006.01)

(52) U.S. Cl.
  CPC ........ *B29C 65/561* (2013.01); *B29C 66/8161* (2013.01); *B29C 66/8432* (2013.01); *B65B 7/2878* (2013.01); *B67B 3/2066* (2013.01); *F16F 1/027* (2013.01); *B29C 65/7861* (2013.01); *B65D 5/749* (2013.01)

(58) Field of Classification Search
  CPC . B29C 65/561; B29C 65/368; B29C 65/3644; B65D 5/749; F16F 1/027
  See application file for complete search history.

(56) References Cited

OTHER PUBLICATIONS

Written Opinion (PCT/ISA/237) dated Jul. 11, 2018, by the European Patent Office as the International Searching Authority for International Application No. PCT/EP2018/074326, 6 pages.

\* cited by examiner

WELDING HEAD

TECHNICAL FIELD

The invention relates to a welding head for welding a lid onto a container, particularly a sealed container for packaging pourable food products. The welding head according to the invention is especially suitable for welding a lid onto a neck that has been moulded on a sheet packaging material, the latter being in turn adapted to be folded, filled with a pourable food product and sealed to form a container.

BACKGROUND ART

As known, many pourable food products, such as fruit juice, UHT (ultra-high-temperature treated) milk, wine, tomato sauce, etc., are sold in containers made of sterilized sheet packaging material.

A typical example of this type of containers is the parallelepiped-shaped container for liquid or pourable food products known as Tetra Brik Aseptic (registered trademark), which is made by folding and sealing laminated strip packaging material.

The packaging material has a multilayer structure substantially comprising a base layer for stiffness and strength, which may include a layer of fibrous material, e.g. paper, or mineral-filled polypropylene material, and a number of lamination layers of heat-sealable plastic material, e.g. polyethylene films, covering both sides of the base layer.

In the case of aseptic containers for long-storage products, such as UHT milk, the packaging material also comprises a layer of gas-barrier material, e.g. aluminium foil or ethyl vinyl alcohol (EVOH) film, which is superimposed on a layer of heat-sealable plastic material, and is in turn covered with another layer of heat-sealable plastic material forming the inner face of the container eventually contacting the food product.

Containers of this sort are normally produced on fully automatic packaging machines, which are fed with a web of packaging material that is sterilized on the packaging machine, e.g. by applying a chemical sterilizing agent, such as a hydrogen peroxide solution, which, once sterilization is completed, is removed from the surfaces of the packaging material, e.g. evaporated by heating. The web of packaging material so sterilized is then maintained in a closed, sterile environment, and is folded and sealed longitudinally to form a vertical tube.

The tube is filled with a sterilized or sterile-processed food product, and is sealed and subsequently cut along equally spaced cross sections to form pillow packs, which are then folded mechanically to form respective finished, e.g. substantially parallelepiped-shaped, containers.

To open the containers described above, various solutions have been proposed, including reclosable opening devices made of plastic material and substantially comprising a pouring spout, defining a through pouring opening and fitted to a hole in a wall of the container.

When producing the opening device, the opening of the pouring spout is sealed by a closing element connected integrally to the pouring spout and detachable from it along a tear line. The closing element extends at the same level as the packaging material, so as to seal the hole in the wall of the container. On the side facing the lid, the closing element has an integral projecting pull ring, the free end of which is pulled by the user to detach the closing element from the pouring spout along the tear line and so open the pouring opening. More specifically, the pull ring extends inside, and at a predetermined distance from, the pouring spout.

It is also possible to fix the closing element of the opening device directly over a prelaminated hole in the packaging material, i.e. a hole formed in the base layer only and covered by the other lamination layers, including the layer of gas-barrier material.

In both cases, a removable, e.g. screw or hinged, lid, is subsequently fitted to the pouring spout in order to outwardly close the latter.

The opening devices disclosed above have excellent sealing properties. However, they have the drawback that, the first time a user opens a container closed by an opening device of the kind disclosed above, two steps must be performed before being capable of pouring the content of the container. In a first step, the user removes the lid removably fitted to the pouring spout. In a second step, the user detaches the closing element from the pouring spout along the tear line, by acting on the pull ring.

In order to provide a container that can be opened in one step only, a solution has been proposed, in which the closing element of the opening device is formed in one piece with a protruding portion extending inside the pouring spout and welded to the lid. An end wall of the lid is provided with a disk-shaped welding promoting element that is welded to the protruding portion so that, when removing the lid from the pouring spout, the protruding portion and the closing element remain attached to the lid. Thus, the first time a user opens the container, the lid and the closing element can be removed from the pouring spout in a single operation. A container provided with a lid of the kind disclosed above can be called a "one-step-opening container".

In order to weld the lid to the protruding portion integral with the closing element, it is possible to use an electric induction generating element comprising a coil that, when activated, induces an electric current in a conductive layer of the welding promoting element. Localized heat is consequently generated in a heat-sealable layer of the welding promoting element, which causes the end wall of the lid—including the welding promoting element—to become attached to the protruding portion.

To ensure that the end wall of the lid is correctly welded to the protruding portion, the coil of the electric induction generating element needs to be properly positioned with respect to the end wall of the lid.

This issue is particularly critical, also in view of the dimensions, shape and position of the neck and the lid, which may vary within relatively large tolerances. In particular, the dimensions and shape of the container may vary to a certain extent due to the flexible nature of the material forming the container, namely a sheet packaging material. The dimensions and shape of the neck may also vary within a relatively large range, because the neck is moulded directly on the sheet packaging material forming the container, by using a polymeric material having a limited stiffness. For these reasons, the position of the neck relative to the corresponding container may vary from a container to another.

Also the lid, which is made of a relatively flexible material such as plastics, may have a shape and dimensions that are not exactly repeatable between different lids.

In particular, the container (with the lid—still to be welded—positioned on the neck) may have a height that is "shorter" or "taller" than a nominal value. In this way, the welding head is not arranged in the desired position during the welding operation.

This situation is worsened because the containers at issue, which are normally sealed containers for packaging pourable food products, are produced by machines that operate at significantly high output rates. Hence, the available time for welding a lid to a protruding portion of a neck is limited.

Consequently, it may happen that some lids are not perfectly welded to the corresponding containers.

DISCLOSURE OF INVENTION

An object of the invention is to provide a welding head that is capable of effectively and reliably welding a lid to an opening device of a container.

Another object is to provide a welding head for welding lids onto opening devices of respective containers, which ensures a good welding quality even if the containers interact with the welding head at a position that may vary between different containers.

A further object is to provide a welding head that can be used to weld lids onto respective opening devices of containers, which guarantees good performances in spite of the containers, and/or the opening devices, and/or the lids, having shapes and/or dimensions that differ from one another.

Another object is to provide a welding head that can be used to weld a lid to an opening device of a container, which ensures a good welding quality even at high production rates.

According to the invention, there is provided a welding head comprising a welding element for welding a lid to an opening device of a container, a supporting body for supporting the welding element and a compensating device for compensating a possible mutual mispositioning of the welding element and the lid during welding of the lid to the opening device, the compensating device being interposed between the supporting body and the welding element, the compensating device comprising a planar spring arrangement provided with at least one planar spring element having a first member and a second member mutually connected by means of deformable elements.

The compensating device allows the welding element to be properly positioned with respect to subsequently processed lids, even if the lids are in positions that differ from the respective theoretical positions. A good welding quality is thus ensured.

The mispositioning between the lid and the welding element, which can be compensated by the compensating device, may in particular be due to a variability in dimensions and/or shape of the neck and/or of the lid.

Owing to the compensating device, the lid may be successfully welded to the opening device, irrespective of the relatively large tolerances within which the dimensions or shape of the container, neck or lid are variable.

In particular, the welding head is capable of welding the lid also to opening devices of containers that have a height that is greater or smaller than a nominal height.

Furthermore, by compensating the variations of the dimension of the container and of the neck, the welding time necessary for welding the lid to the opening device may be minimized, which makes the welding head according to the invention capable of operating even at high production rates.

In an embodiment, the welding element comprises an electric induction generating element for generating an electric current capable of heat-sealing the lid to the opening device.

The compensating device allows a coil included in the electric induction generating element to be properly positioned relative to subsequently processed lids. The electric induction field generated by the coil, which is localized in a relatively narrow zone, may thus effectively melt the material forming the lid and/or the opening device, thereby ensuring a good welding quality.

BRIEF DESCRIPTION OF THE DRAWINGS

The invention will be better understood and carried out with reference to the enclosed drawings, which show an exemplifying and non-limiting embodiment thereof, in which.

BEST MODES FOR CARRYING OUT THE INVENTION

Figure 1:
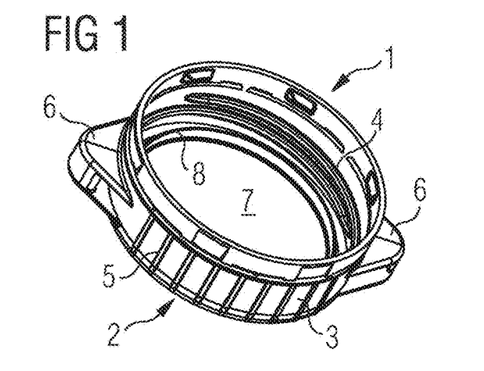
FIG. 1 is a perspective view of a lid intended to be applied onto a neck of a container.

FIG. 1 shows a lid 1 intended to be applied onto a container neck. The lid 1 comprises an end wall 2, which may be shaped as a disk, particularly a circular disk. The lid 1 further comprises a side wall 3, which may be substantially cylindrical, appended to the end wall 2. The side wall 3 extends around an axis of the lid 1, whereas the end wall 2 extends transversely, in particular perpendicularly, to the axis of the lid 1. The side wall 3 is provided with one or more internal threads 4 capable of engaging with corresponding threads obtained on the container neck. The side wall 3 may be externally provided with a plurality of knurls 5, which allow a user to more easily grip the lid 1.

Two appendages 6 project from an outer surface of the side wall 3, at diametrically opposite positions.

A welding promoting element 7, which may be for example disk-shaped, is anchored to an inner surface of the end wall 2, i.e. to a surface that, in use, faces the container neck.

The lid 1 may comprise an annular rib 8, obtained integrally with the end wall 2, which axially protrudes from the end wall 2 towards the inside of the lid 1. The annular rib 8 defines a seat for receiving the welding promoting element 7.

The welding promoting element 7 is defined by a multi-layer sheet element distinct from the end wall 2 and permanently connected to the latter. In particular, the welding promoting element 7 comprises a layer of conductive material, e.g. an aluminium foil, and at least two layers of heat-sealable plastic material, e.g. polyethylene films, covering both sides of the layer of conductive material and defining respective opposite faces of the welding promoting element 7. A face of the welding promoting element 7 is welded to the end wall 2 by the heat generated when inducing a current in the layer made of conductive material.

Figure 2:
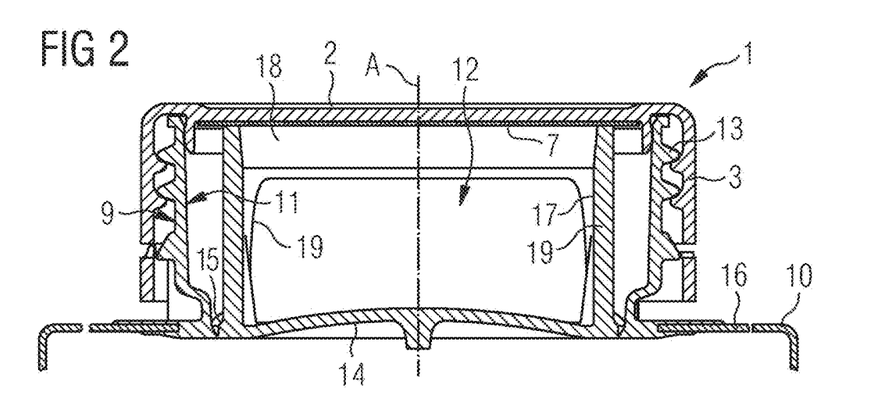
FIG. 2 is an enlarged cross-section showing the lid of FIG. 1, screwed onto a corresponding neck.

As shown in FIG. 2, the lid 1 is intended to be applied onto a neck 9 of a container 10, particularly a sealed container for packaging pourable food products.

The neck 9 is included in an opening device comprising a pouring spout 11 fixed to the packaging material forming the container 10. The neck 9 has a substantially cylindrical tubular shape and extends around an axis A. The neck 9 defines a pouring opening 12, through which the content of the container 10 can be poured by a user. On an outer surface of the neck 9, extending around the axis A, one or more outer threads 13 are provided, which are capable of engaging with the inner threads 4 of the lid 1. Thus, the lid 1 can be removably coupled to the neck 9. When the lid 1 is screwed onto the neck 9, the axis of the lid 1 is coincident with the axis A of the neck 9.

The pouring opening 12 is initially closed by a closing element 14 that is integrally connected to the pouring spout 11 at a tear line 15, along which the closing element 14 can be detached from the pouring spout 11.

The pouring spout 11 and the closing element 14 are formed in one piece on a receiving portion 16 of the packaging material forming the container 10, whilst the lid 1 is formed separately from the pouring spout 11 and the closing element 14, and then fitted thereto. The pouring spout 11 and the closing element 14 may be obtained by moulding molten plastic material—in particular by an injection moulding operation—on the packaging material before it is transformed into a container 10.

The receiving portion 16 may be defined by a so called pre-laminated hole made in the packaging material forming the container 10, i.e. a hole made through a base layer of the packaging material and covered by one, two, or more lamination layers of the packaging material, which seal the hole. In an alternative embodiment, the receiving portion 16 may be simply defined by a hole made through the whole thickness of the packaging material forming the container 1, which is intended to be sealed by the pouring spout 11 and the closing element 14. In another embodiment, the receiving portion 16 may be defined by a patch fixed to the rest of packaging material to seal a hole formed, in this case, through the whole thickness of the packaging material.

The closing element 14 is formed in one piece with a protruding portion 17 extending through the pouring opening 12. The protruding portion 17 is intended to be welded to the welding promoting element 7, after the lid 1 has been screwed onto the neck 9.

The protruding portion 17 may comprise an annular body 18 for contacting the welding promoting element 7, and two or more legs 19 for connecting the annular body 18 to the closing element 14. In the example shown, the legs 19 are diametrically opposite one another.

The container 10 is formed, filled and sealed in a filling machine and is already provided with the pouring spout 11, the closing element 14 and the protruding portion 17 when leaving the filling machine. Thereafter, as will be described in greater detail hereinbelow, an applying head screws a lid 1 onto the neck 9. The welding promoting element 7 of the lid 1 is then welded to the protruding portion 17, for example by inducing an electric current in the conductive layer of the welding promoting element 7. This current melts the heat-sealable layer of the welding promoting element 7 that faces the neck 9, thereby permanently joining the welding promoting element 7 to the protruding portion 17.

In use, the first opening of the container 10 is obtained by rotating the lid 1 relative to the pouring spout 11 around the axis A. At the beginning of the rotation impressed by the user on the lid 1, the legs 19 bend in the direction of rotation, thereby exerting a pulling action on the closing element 14 at a given point of the tear line 15. In other words, due to the legs 19, the torque exerted on the lid 1 is transformed in a pulling action on the closing element 14, which starts to detach from the pouring spout 11 at two given points along the tear line 15.

Figure 3:
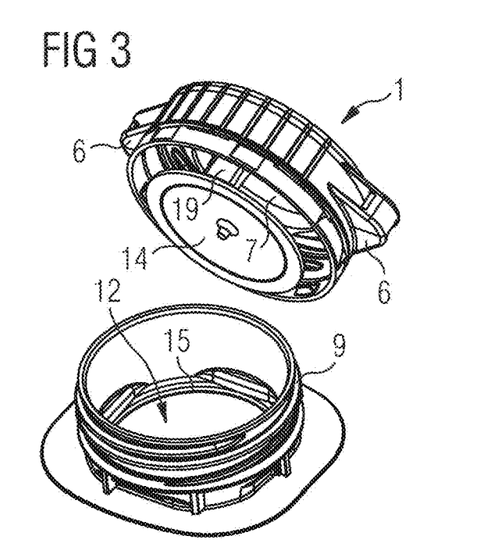
FIG. 3 is a perspective view showing the lid and neck of FIG. 2, when the lid has been removed from the respective container by a user.

By continuing to rotate the lid 1, the latter unscrews completely from the pouring spout 11. As shown in FIG. 3, the closing element 14 is fully detached from the pouring spout 11 along the tear line 15, and remains attached to the lid 1. At this point, the user can pour the content of the container 10 through the pouring opening 12.

The user can then use the lid 1 to again close or open the container 10, by screwing the lid 1 onto the neck 9 or respectively unscrewing the lid 1 from the neck 9, as often as desired.

Figure 4:
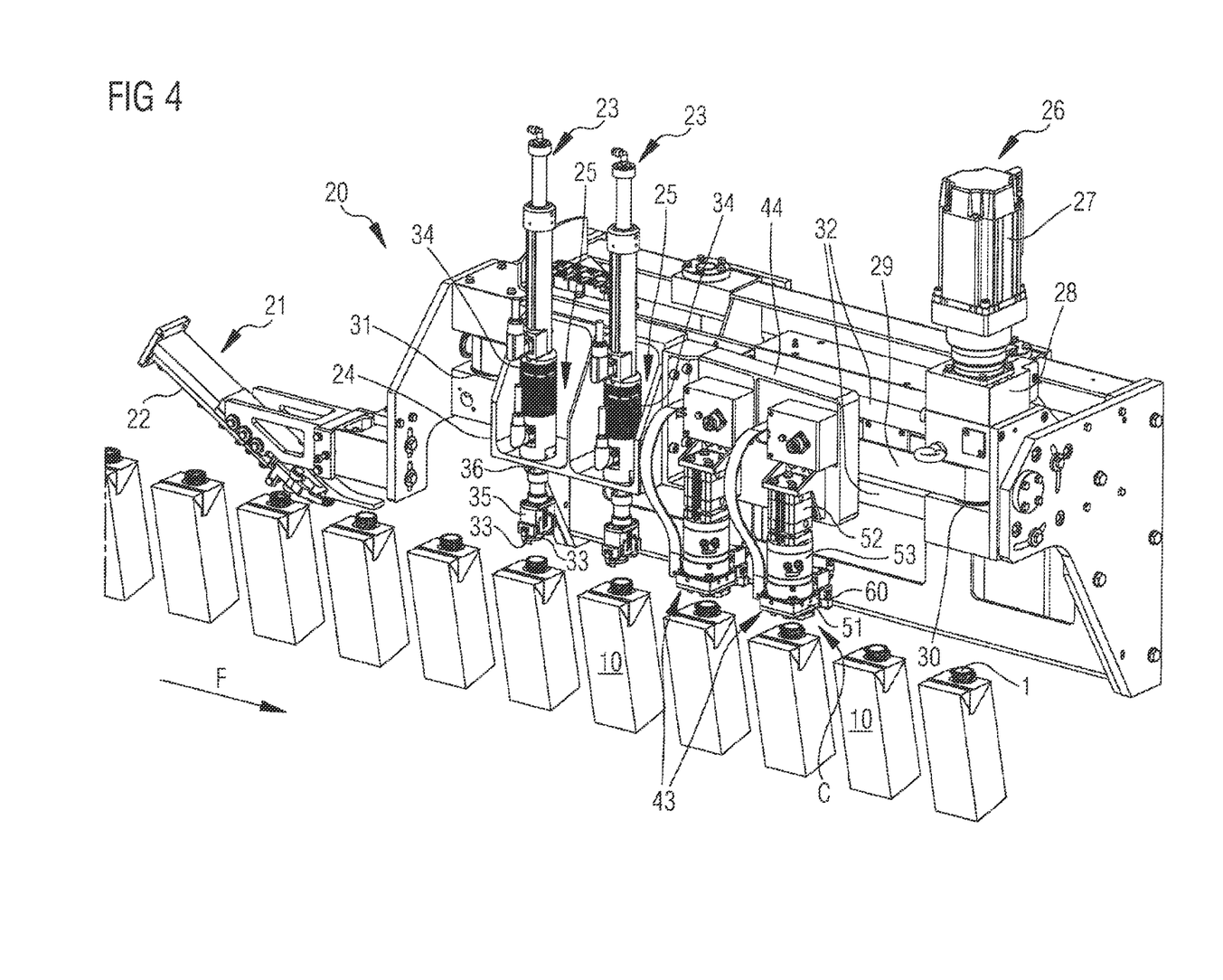
FIG. 4 is a perspective view showing an apparatus for applying lids onto corresponding necks of containers.

FIG. 4 shows an applying unit or apparatus 20 for applying lids 1 onto respective containers 10, which have already been formed, filled and sealed in a filling machine provided upstream of the apparatus 20.

Each container 10 has, in the embodiment shown, a substantially parallelepiped body and a slanted top wall, i.e. a top wall that is inclined with respect to a base wall of the container 10. In other words, when the base wall of the container 10 rests on a horizontal surface, the top wall is inclined with respect to a horizontal plane parallel to the base wall.

In another embodiment, not shown, each container 10 has a substantially parallelepiped body and a top wall substantially parallel to the base wall.

In general, the apparatus 20 may work with containers 10 having different shapes and/or dimensions.

The apparatus 20 comprises a conveying device, which is not shown, for advancing the containers 10 in an advancement direction F, particularly along a rectilinear path. The conveying device may comprise a linear conveyor, for example a belt conveyor or a roller conveyor. The conveying device may be configured to advance the containers 10 continuously along the advancement direction F.

Upstream of the conveying device, a sequencing device may be provided, in order to arrange the containers 10 at a preset distance one from another, i.e. in a sequence having a preset pitch. It is thus ensured that the containers 10 are regularly spaced when entering the apparatus 20.

The apparatus 20 further comprises a distribution unit 21 for feeding the lids 1 to the necks 9 of the containers 10 advancing along the advancement direction F. The distribution unit 21 may comprise a slide 22 and a feeding unit, which is not shown, for supplying the lids 1 to the slide 22. The slide 22 is inclined with respect to the conveying device that conveys the containers 10 along the advancement direction F, so that the distance between the slide 22 and the conveying device decreases when moving along the advancement direction F.

At a lower end of the slide 22, a dispensing opening is provided, which is so configured as to loosely retain one lid 1.

When a container 10, advanced along the advancement direction F, reaches the slide 22, the neck 9 of the container 10 interacts with the lid 1 retained by the dispensing opening of the distribution unit 20 and removes the lid 1 from such dispensing unit. In other words, the lid 1 is stripped from the dispensing opening located downstream of the slide 22 by the neck 9 of an underlying container 10. Therefore, downstream of the slide 22, the lid 1 is positioned on the neck 9, although not being fully screwed onto the neck 9.

The apparatus 20 further comprises a group of applying heads 23 for applying the lids 1 to the respective containers 10, particularly by screwing each lid 1 onto a corresponding neck 9 of a container 10.

In the embodiment shown, the group of applying heads comprises two applying heads 23, arranged in sequence along the advancement direction F. However, the group of applying heads may comprise also a number of applying heads 23 different from two, for example three, four or more applying heads 23. Each applying head 23 is arranged to screw a lid 1 onto a corresponding neck 9.

The applying heads 23 are supported by a common support element 24. The support element 24 may be formed in one piece, or may be assembled from a plurality of components that are connected one to another so as to behave, in use, like a single piece.

In the example shown, the support element 24 is shaped as a back plate from which a plurality of projecting walls extend, so as to define a plurality of recesses 25, in each of which an applying head 23 is partially housed. The support element 24 may nevertheless have shapes different from that shown in the drawings.

The applying heads 23 are fitted to the support element 24 so that the distance between two consecutive applying heads 23 is equal to the distance between two consecutive containers 10 advanced along the advancement direction F, i.e. to the pitch of the containers 10.

A movement device 26 is provided for moving the group of applying heads 23 along the advancement direction F, so that each applying head 23 is coupled to an underlying container 10 for a portion of the path thereof along the advancement direction F. In other words, the movement device 26 allows the applying heads 23 to follow the containers 10 with which they interact along a portion of the path of the containers 10. The applying heads 23 are hence movable synchronously with the conveying device that advances the containers 10 in the advancement direction F, along the above-mentioned portion of the path of the conveying device.

The movement device 26 may comprise a motor 27, possibly connected to a gear box 28, arranged for driving a pulley 30 around which a belt 29 is wound. The belt 29 is further wound around a driven pulley 31. The belt 29 has an active branch that is intended to drive the support element 24 and runs parallelly to the advancement direction F.

A pair of guiding bars 32, each of which extends parallelly to the advancement direction F, is provided for guiding the support element 24 as the latter moves along the advancement direction F. In particular, a sliding element that is not shown is slidable along the guiding bars 32. The support element 24 is fixed relative to the sliding element.

One or more connecting plates, which are not shown, are fastened to the belt 29. The connecting plates are fixed relative to the sliding element mentioned above.

The motor 27 is configured for rotating the pulley 30 in two opposite rotation directions, so that the belt 29 may be driven forwards or backwards parallelly to the advancement direction F.

When the active branch of the belt 29 moves parallelly to the advancement direction F, the support element 24—which, as explained above, is fixed relative to the belt 29—moves together with the belt 29. The applying heads 23, which are supported by the support element 24, are therefore moved forwards or backwards along the advancement direction F. In particular, when the applying heads 23 are moved forwards along the advancement direction F, the applying heads 23 can follow respective containers 10 so that each applying head 23 applies a lid 1 on the corresponding neck 9. After disengaging from respective containers 10, the applying heads 23 can be moved backwards along the advancement direction F so as to be brought back to a starting point at which the applying heads 23 can start to interact with new containers 10.

The movement device 26 thus moves synchronously the applying heads 23, which means that the applying heads 23 are moved together along the advancement direction F by the movement device 26. In other words, the applying heads 23 are moved by the movement device 26 simultaneously and by the same extent, along the advancement direction F.

In an embodiment that is not shown, the movement device 26 may comprise a toothed rack fixed relative to the support element 24. The motor 27 has a shaft coupled to a toothed wheel or pinion that engages with the toothed rack, so as to move the latter forwards or backwards parallelly to the advancement direction F.

More in general, the movement device 26 may comprise any transmission device that is capable of transforming rotation of a shaft of the motor 27 into a linear motion of a linearly movable element fixed relative to the support element 24.

Each applying head 23 comprises a pair of gripping elements 33 intended to interact with the lid 1 for screwing it onto the neck 9. The gripping elements 33 of an applying head 23 are supported by a supporting component 35 connected to a stem 36. Each applying head 23 further comprises a driving device 34 for driving the gripping elements 33. The driving device is fastened to the support element 24. The driving device 34 is directly connected to the stem 36, so as to move the supporting component 35 and hence drive simultaneously both the gripping elements 33.

In particular, the driving device 34 is capable of causing the stem 36 to slide parallelly to the longitudinal axis thereof, thereby displacing the supporting component 35 and hence the gripping elements 33 in a direction parallel to the axis A of a neck 9. The gripping elements 33 can thus be moved towards a lid 1 to be screwed, or alternatively be moved away from a lid 1 that has already been screwed onto the corresponding neck 9. To this end, the driving device 34 may comprise a linear motor.

The driving device 34 is furthermore configured to rotate the stem 36, and hence the supporting component 35 and the gripping elements 33, around a longitudinal axis of the stem 36 that, in use, coincides with the axis A of a neck 9.

By rotating the supporting component 35 around the longitudinal axis of the stem 36, while the latter is moved towards the container 1, the gripping elements 33 move along a helix, thereby screwing the lid 1 onto the neck 9, as will be described in greater detail hereinbelow.

In an embodiment that is not shown, the applying heads 23 may be configured to apply, onto the containers 10, lids 1 that do not comprise the appendages 6. i.e. lids 1 that are delimited by a cylindrical side wall 3.

The apparatus 20 further comprises a plurality of welding heads 43 for welding, in particular induction welding, the lid 1 to the protruding portion 17 that projects from the closing element 14. In particular, each welding head 43 is configured to generate in the conductive layer of the welding promoting element 7 an electric current, which melts the heat-sealable layer of the welding promoting element 7 facing the closing element 14. This heat-sealable layer thus adheres to the protruding portion 17, which consequently becomes permanently attached to the lid 1.

The welding heads 43 are arranged downstream of the applying heads 23, along the conveying device that advances the containers 10 in the advancement direction F. The welding heads 43 thus interact with the containers 10 after the applying heads 23 have screwed the lids 1 onto the containers 10.

The number of welding heads 43 may be equal to the number of applying heads 23. In the example shown, two welding heads 43 are provided, but this condition is not essential and the number of welding heads 43 could also be different from two.

The distance between two consecutive welding heads 43 is equal to the distance between two consecutive containers advancing along the advancement direction F.

Similarly, the distance between the last applying head 23 and the first welding head 43 is equal to the distance between two consecutive containers 10.

The welding heads 43 are movable forwards and backwards in the advancement direction F, i.e. are movable synchronously with the conveying device that advances the containers 10 in the advancement direction F, along a part of the path of the conveying device. Thus, each welding head 43 is capable of following a container 10 in order to interact with the corresponding lid 1 for a time sufficient to ensure welding of the lid 1 to the protruding portion 17. When the lid 1 has been welded to the protruding portion 17, the welding head 43 moves backwards so as to reach an initial position in which it is ready to weld a new lid 1 to the corresponding container 10.

All the welding heads 43 can be moved synchronously by a common mechanism. To this end, all the welding heads 43 can be supported by a common support member 44 so that, by moving the support member 44 in the advancement direction F, all the welding heads 43 are moved together in the advancing direction F forwards or backwards.

In the example shown, the welding heads 43 are moved by the same movement device 26 that also displaces the applying heads 23. The support member 44 is fixed relative to the support element 24, for example because the support member 44 is directly fastened to the support element 24. Thus, when the motor 27 moves the support element 24 by driving the belt 29, the support member 44, and consequently also the welding heads 43, are also displaced in the advancement direction F.

The welding head 43 comprises a welding element 51. In particular, the welding element comprises an electric induction generating element including a coil that is not shown. By activating the coil, an electric current is induced in the conductive layer of the welding promoting element 7, with a consequent generation of localized heat causing the heat-sealable layer of the welding promoting element 7 facing the neck 9 to be welded to the protruding portion 17.

The welding head 43 comprises an actuator device 52 for displacing the welding element 51 in a displacement direction arranged transversely, in particular perpendicularly, to the advancement direction F, so as to move the welding element 51 towards a lid 1 or alternatively away from a lid 1. More precisely, the actuator device 52 is intended to move the welding element 51 parallelly to the axis of the lid 1 that is being welded.

The actuator device 52 may comprise for example an electric linear motor or a pneumatic actuator.

The welding head 43 comprises a supporting body 53 that supports the welding element 51 and that is, in turn, supported by the actuator device 52.

The actuator device 52 is configured to displace the electric induction generating element 51 between an active configuration (not shown) and an inactive configuration C, shown in FIG. 4. In the inactive configuration C, the electric induction generating element 51 is at a distance from the lid 1, so as not to interact with the latter.

Each welding head 43 further comprises a compensating device 60 that allows the electric inducting generating element 51 to be properly positioned relative to the end wall 2 of the lid 1, by compensating a possible misalignment between the electric inducting generating element 51 and the lid 1. The compensating device 60 is interposed between the supporting body 53 of the welding head 43 and the welding element 51.

Figure 5:
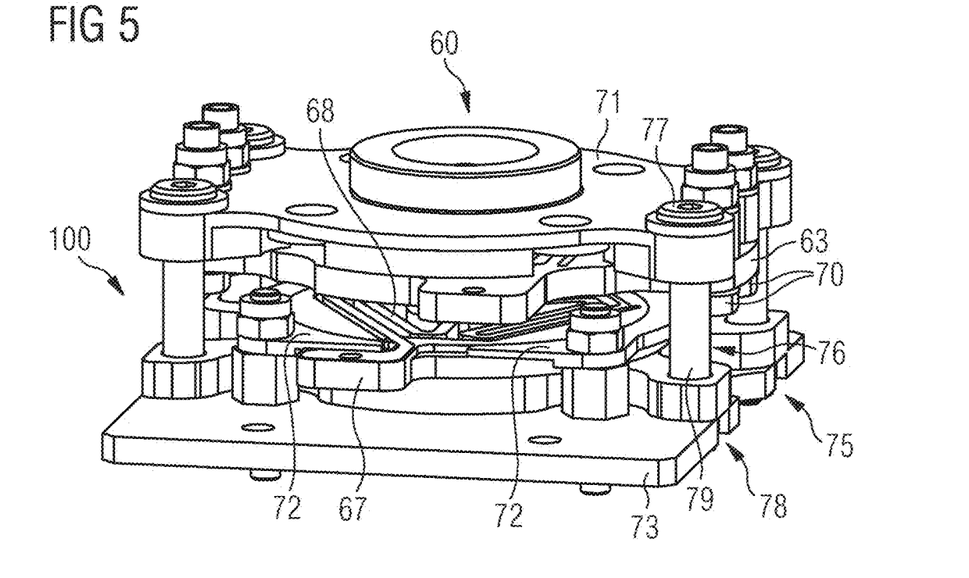
FIG. 5 is a perspective view, with parts removed for clarity, of a compensating device of a welding head of the apparatus of FIG. 4.
Figure 6:
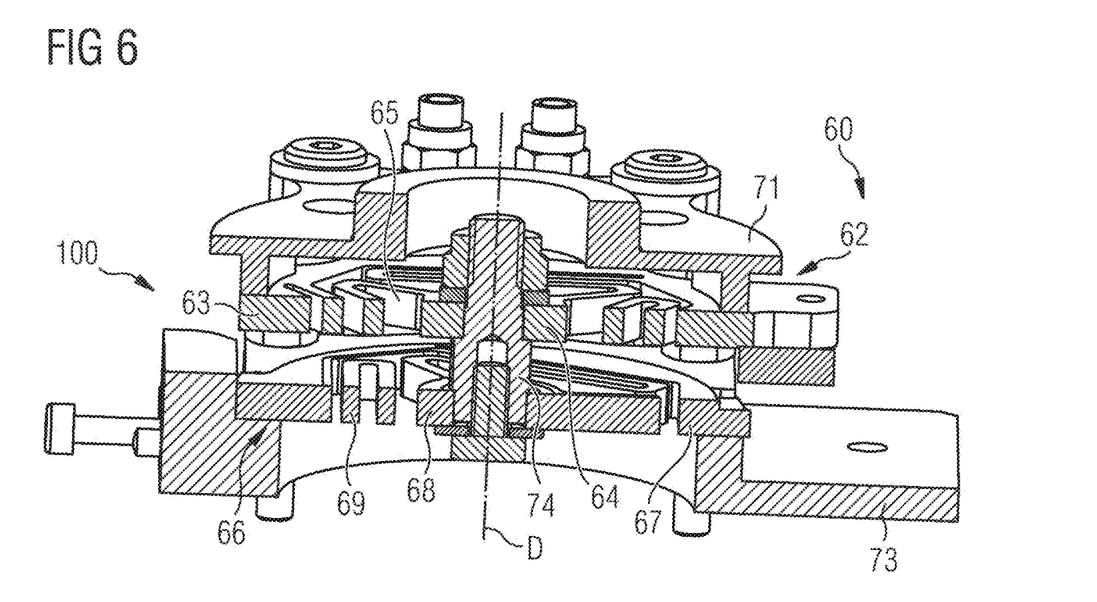
FIG. 6 is a cross section of the compensating device of FIG. 5.

With reference to FIGS. 5 and 6, the compensating device 60 comprises a planar spring arrangement 100 provided with a planar spring element 66 having a first member 63 and a second member 64 mutually connected by means of deformable elements 65.

The first member 63 is arranged in a peripheral area of the planar spring element 62 and the second member 64 is arranged in a central area of the planar spring element 62.

The planar spring arrangement 100 is also provided with a further planar spring element 66 having a further first member 67 and a further second member 68 mutually connected by means of further deformable elements 69.

The further first member 67 is arranged in a peripheral area of the further planar spring element 66 and the further second member 68 is arranged in a central area of the further planar spring element 66.

When the deformable elements 65 are not deformed, the first member 63, the second member 64 and the deformable elements 65 define a plane.

When the further deformable elements 69 are not deformed, the further first member 67, the further second member 68 and the further deformable elements 69 define a further plane.

The above-mentioned plane is parallel to the above-mentioned further plane.

When the deformable elements 65 are deformed, the first member 63 and the second member 64 move away from each other along a displacement direction D. The displacement direction D is perpendicular to the above-mentioned plane.

When the further deformable elements 69 are deformed, the further first member 67 and the further second member 68 move away from each other along the displacement direction D. The displacement direction D is perpendicular to the above-mentioned further plane.

The first member 63 is fixed, in particular by means of bolts 70, to a first plate 71 connectable to the supporting body 53.

The further first member 67 is fixed, in particular by means of brackets 72, to a second plate 73 connectable to the welding element 51.

The second member 64 and the further second member 68 are connected to each other by means of a connecting pin 74.

In this way, the planar spring element 62 and the further planar spring element 66 are connected in series.

The compensating device 60 further comprises retaining elements 75 for limiting the relative movement of the first plate 71 and the second plate 73.

In the embodiment shown, the compensating device comprises four retaining elements 75.

Each retaining element 75 comprises a connecting element 76 having a head 77 and a connecting end 78, opposite to the head 77, fixed to the second plate 73. In particular, the connecting element 76 is a bolt and the connecting end 78 is a threaded end of the bolt that can be screwed in a threaded bore of the second plate 73.

The retaining element 75 further comprises an elongated body 79, in particular a cylindrical body, interposed between the head 77 and the connecting end 78 and received in a through hole of the first plate 71.

The through hole has a first transversal dimension, in particular a first diameter.

The cylindrical body 79 has a second transversal dimension, in particular a second diameter.

The first diameter, i.e. the diameter of the through hole, is significantly bigger than the second diameter, i.e. the diameter of the elongated body 75.

Due to the size of the first diameter and the second diameter, when the first plate 71 and the second plate 73 move with respect to each other the elongated body 75 does not interact with a surface of the first plate 71 delimiting the through hole. In this way, the retaining element 75 does not act as a guiding device for the first plate 71 and the second plate 73, so avoiding the risk of jamming when the first plate 71 and the second plate 73 move with respect to each other.

In a rest configuration of the compensating device 60, the head 77 rests on the first plate 71, in particular the head 77 is received in a seat of the first plate 71 and rests on a rest surface defining the bottom of the seat.

In the rest configuration of the compensating device 60, the retaining element 75 prevents the first plate 71 and the second plate 73 to move away from each other beyond a defined (maximum) stroke.

In particular, the retaining element 75 prevents the second plate 73 to move away from the first plate 73—beyond the above-mentioned defined (maximum) stroke—due to the action of the weight of the second plate 73 and the weight of the welding element 51 connected to the second plate 73.

In the rest configuration, the planar spring element 62 and the further planar spring element 66 are pre-loaded, by means of the retaining element 75, to a pre-set amount. The above-indicated pre-set amount of the pre-load is chosen in such a way that, during operation, it is possible to guarantee that the force applied by the welding element 51 to the lid 1 is above a required (minimum) threshold. In this way, proper sealing of the lid 1 is obtained.

In a working configuration of the compensating device 60, the first plate 71 and the second plate 73 can move with respect to one another to compensate possible misalignments of the lid 1 and the opening device and dimensional tolerances of the lid 1 and/or the opening device and/or the container 10.

The movement of the first plate 71 and the second plate 73 with respect to one another is guided by the first planar spring element 62 and the second planar spring element 66.

In the working configuration of the compensating device 60, the head 77 is detached from the first plate 71, in particular the head 77 is detached form the rest surface defining the bottom of the seat.

When the compensating device 60 moves from the rest configuration to the working configuration, the welding element 51 is displaced along the displacement direction D.

Figure 7:
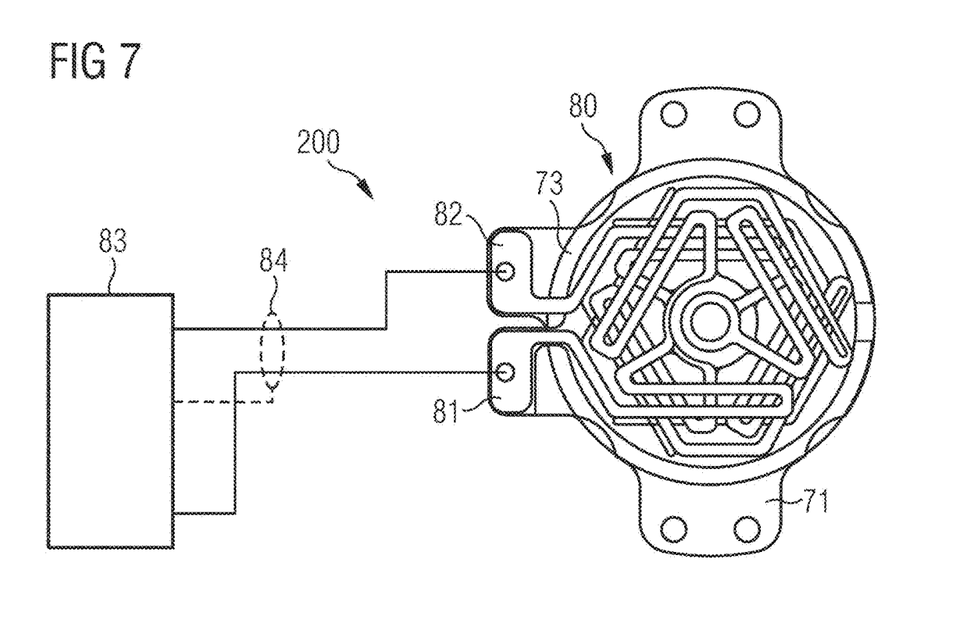
FIG. 7 is a schematic top view, with parts removed for clarity, of a detecting device for detecting integrity of the compensating device of FIG. 5.
Figure 8:
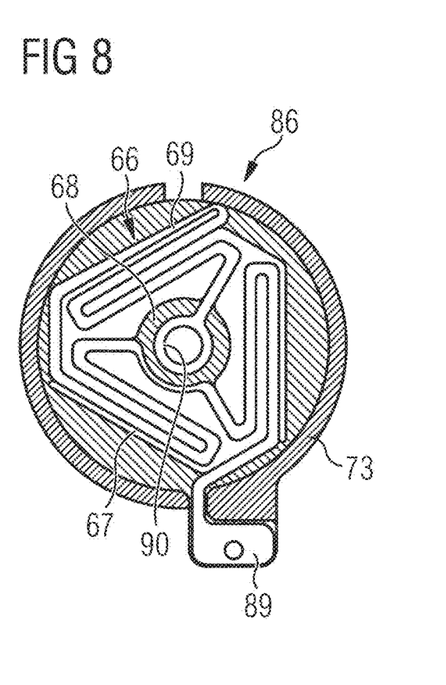
FIG. 8 is a partly sectioned plan view of a component of the detecting device of FIG. 7.
Figure 9:
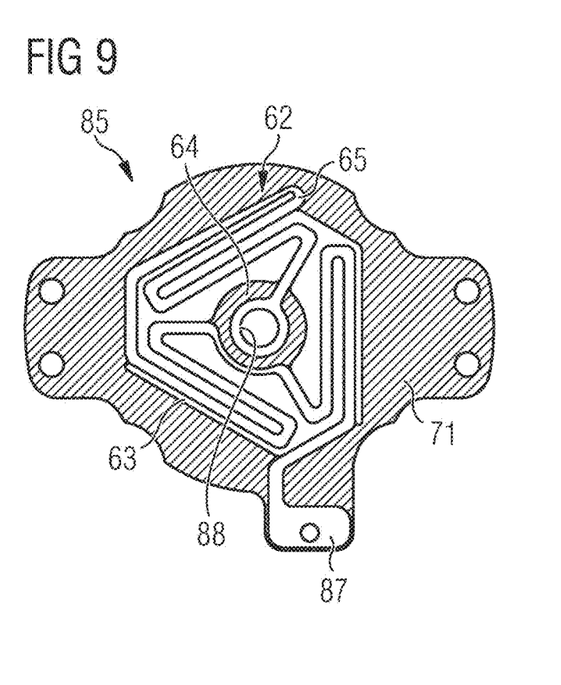
FIG. 9 is a partly sectioned plan view of another component of the detecting device of FIG. 7.

With reference to FIGS. 7 to 9, the welding head 43 comprises detecting device 200 a for detecting integrity of the compensating device 60.

The detecting device 200 comprises an electric circuit 80, an electric power generator 83 and a detecting element 84.

The planar spring arrangement 100 defines the electric circuit 80.

In other words, the electric circuit 80 is obtained in the planar spring arrangement 100.

The electric circuit 80 has a first end 81 intended to be connected to a first electric pole of the electric power generator 83 and a second end 82 intended to be connected to a second electric pole of the electric power generator 83.

During operation, electric current flows in the electric circuit 80 and is detected by the detecting element 84.

In case the planar spring arrangement 100 is damaged (i.e. broken), the electric current stops flowing in the electric circuit 80. This is detected by the detecting element 84 that also generates an alarm signal. The apparatus 20 is, therefore, stopped and the planar spring arrangement 100 is repaired or replaced.

The electric circuit 80 comprises an electric circuit portion 85 obtained in the planar spring element 62 and a further electric circuit portion 86 obtained in the further planar spring element 66.

The electric circuit portion 85 is defined by (parts of) the first member 63, the second member 64 and the deformable elements 65.

The electric circuit portion 85 has a first end zone 87 that defines the first end 81 and a second end zone 88, opposite the first end zone 87.

The further electric circuit portion 86 is defined by (parts of) the further first member 67, the further second member 68 and the further deformable elements 69.

The further electric circuit portion 86 has a further first end zone 89 that defines the second end 82 and a further second end zone 90, opposite the first end zone 89.

The second end zone 88 and the further second end zone 90 are electrically connected by means of an electrically connecting element. In this way, the electric circuit portion 85 and the further electric circuit portion 86 are electrically connected so as to form the electric circuit 80.

The above-mentioned electrically connecting element may be (a part of) the connecting pin 74 made of electrically conductive material.

In the embodiment show, the electric circuit 80 is obtained by (at least partly) covering with a conductive paint the planar spring arrangement 100, in particular by covering (at least portions of) of the planar spring element 62 and the further planar spring element 66, even more in particular by covering (at least portions of) the first member 63, the second member 64, the deformable elements 65, the further first member 67, the further second member 68 and the further deformable elements 69, so as to form an uninterrupted path extending between the first end 81 and the second end 82.

In another embodiment, the planar spring arrangement may comprise, or be made of, an electrically conductive material.

In operation, the containers 10 are arranged in a sequence at a preset distance from one another by a sequencing device that is not shown. The containers 10 are then advanced along the advancement direction F so as to pass below the distribution unit 21. Here, each container 10 receives a lid 1, which rests on the neck 9 without being fully applied to the latter.

Subsequently, the containers 10 arrive below the applying heads 23, and the gripping elements 33 of each applying head 23 are vertically displaced by the respective driving device 34 and screw the lid 1 onto the neck 9.

The operations described above, aimed at screwing a lid 1 onto a corresponding neck 9, are carried out simultaneously on respective lids 1 by all the applying heads 23 of the group of applying heads 23, i.e. by all the applying heads 23 supported by the support element 24. In the meantime, the support element 24 is moved in the advancement direction F by the movement device 26, so that the applying heads 23 advance along the advancement direction F together with the containers 10, while applying thereon the respective lids 1.

When the lids 1 have been completely screwed onto the necks 9, the gripping elements 33 of each applying head 23 are opened and are displaced upwards in order to disengage from the corresponding lid 1. The movement device 26 now displaces the applying heads 23 backwards, so that the applying heads 23 can engage with a new group of containers 10.

The containers 10 on which the lids 1 have been applied continue to move along the advancement direction F towards the welding heads 43, so as to arrive below the welding heads 43. Each welding head 43 is then displaced downwards, until the respective welding element 51 contacts the end wall 2 of a lid 1.

Owing to the compensation device 60 it is possible to compensate misalignment between the welding head 43 and the respective lid 1. In addition, it is possible to compensate dimensional tolerances of the lid 1 and/or the opening device and/or the container 10.

In this way, the lid 1 is correctly welded to the respective protruding portion 17.

While the welding heads 43 interact with the containers 10, the latter continue to be advanced along the advancement direction F. The welding heads 43 thus weld the lids 1 on the respective containers 10 while moving together with the containers 10 that are advanced along the advancement direction F. To this end, the movement device 26 moves the support member 44 along the advancement direction F, which causes the welding heads 43, which are fixed relative to the support member 44, to be moved together, i.e. synchronously, along the advancement direction F.

Once the lids 1 have been welded onto the necks 9, the welding heads 43 supported by the support member 44 are moved backwards by the movement device 26, so as to reach a position in which the welding heads 43 may engage with a new group of containers 10.

It is intended that, while the applying heads 23 interact with a group of containers 10 by screwing thereon corresponding lids 1, the welding heads 43 interact with a further group of containers 10 by welding the corresponding lids 1 onto respective protruding portions 17. Thus, the screwing and welding operations that were described above are carried out simultaneously on different groups of containers 10.

In an alternative embodiment, the apparatus 20 may be used to apply, onto the necks 9, lids 1 that are substantially round, i.e. that do not possess the appendages 6.

Clearly, changes may be made to the distribution unit as described and illustrated herein without, however, departing from the scope of the present invention as defined in the accompanying claims.

The invention claimed is:

1. A welding head, comprising a welding element for welding a lid to an opening device of a container, a supporting body for supporting the welding element and a compensating device for compensating a possible mutual mispositioning of the welding element and the lid during welding of the lid to the opening device, the compensating device being interposed between the supporting body and the welding element, the compensating device comprising a planar spring arrangement provided with at least one planar spring element having a first member and a second member mutually connected by deformable elements.

2. Welding head according to claim 1, and further comprising a detecting device a for detecting integrity of the compensating device.

3. Welding head according to claim 2, wherein the detecting device comprises an electric circuit, an electric power generator and a detecting element, wherein the planar spring arrangement defines the electric circuit, the electric circuit having a first end connected to a first electric pole of the electric power generator and a second end connected to a second electric pole of the electric power generator and the detecting element detecting an electric current flowing in the electric circuit.

4. Welding head according to claim 3, wherein the planar spring arrangement comprises a further planar spring element that includes a further first member and a further second member mutually connected by further deformable elements, wherein the electric circuit comprises an electric circuit portion obtained in the planar spring element and a further electric circuit portion obtained in the further planar spring element, the electric circuit portion being defined by the first member, the second member and the deformable elements and the further electric circuit portion being defined by the further first member, the further second member and the further deformable elements.

5. Welding head according to claim 4, wherein the electric circuit portion has a first end zone that defines the first end and a second end zone, opposite the first end zone, and wherein the further electric circuit portion has a further first end zone that defines the second end and a further second end zone, opposite the first end zone, the second end zone and the further second end zone being electrically connected by an electrically connecting element.

6. Welding head according to claim 3, wherein the electric circuit is obtained by covering with a conductive paint the planar spring arrangement.

7. Welding head according to claim 6, wherein the planar spring arrangement is provided with a further planar spring element having a further first member and a further second member mutually connected by further deformable elements, wherein the electric circuit is obtained by covering with the conductive paint the first member, the second member, the deformable elements, the further first member, the further second member and the further deformable elements, so as to form an uninterrupted path extending between the first end and the second end.

8. Welding element according to claim 1, wherein the planar spring arrangement is provided with a further planar spring element having a further first member and a further second member mutually connected by further deformable elements.

9. Welding element according to claim 8, wherein the first member is fixed to a first plate connectable to the supporting body and the further first member is fixed to a second plate connectable to the welding element.

10. Welding head according to claim 9, wherein the compensating device further comprises at least one retaining element for limiting the relative movement of the first plate and the second plate.

11. Welding head according to claim 10, wherein said at least one retaining element comprises a connecting element having a head and a connecting end, opposite to the head, fixed to the second plate, and wherein the at least one retaining element further comprises an elongated body interposed between the head and the connecting end and received in a through hole of the first plate, the through hole having a first diameter and the cylindrical body having a second diameter, the first diameter being bigger than the second diameter so that when the first plate and the second plate move with respect to each other the elongated body does not interact with a surface of the first plate delimiting the through hole.

12. Welding head according to claim 8, wherein the second member and the further second member are connected to each other by a connecting pin.

13. Welding head according to claim 1, wherein when the deformable elements are not deformed the first member, the second member and the deformable elements define a plane and when the deformable elements are deformed the first member and the second member move away from each other along a displacement direction (D) perpendicular to the plane.

* * * * *